(12) United States Patent
Albert et al.

(10) Patent No.: US 7,716,166 B2
(45) Date of Patent: May 11, 2010

(54) METHOD AND APPARATUS FOR SIMPLIFYING THE DECODING OF DATA

(75) Inventors: Eric J. Albert, Santa Clara, CA (US); Nathaniel Begeman, Santa Clara, CA (US); Sean Gies, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 486 days.

(21) Appl. No.: 11/650,712

(22) Filed: Jan. 7, 2007

(65) Prior Publication Data

US 2008/0177769 A1    Jul. 24, 2008

(51) Int. Cl.
G06F 7/00    (2006.01)

(52) U.S. Cl. .................. 707/101; 709/217; 709/223

(58) Field of Classification Search ............... 707/1, 707/100–102; 455/566; 715/277; 714/759; 725/135–136, 147; 709/217, 223, 225, 226, 709/231; 687/697
See application file for complete search history.

(56) References Cited

U.S. PATENT DOCUMENTS

| | | | |
|---|---|---|---|
| 5,761,456 A | 6/1998 | Titus et al. | |
| 5,828,884 A * | 10/1998 | Lee et al. | 717/141 |
| 5,991,542 A * | 11/1999 | Han et al. | 717/167 |
| 6,021,482 A * | 2/2000 | Wu et al. | 711/217 |
| 6,292,194 B1 * | 9/2001 | Powell, III | 345/582 |
| 6,456,992 B1 * | 9/2002 | Shibata et al. | 706/33 |
| 6,639,595 B1 * | 10/2003 | Drebin et al. | 345/426 |
| 7,055,169 B2 * | 5/2006 | Delpuch et al. | 725/100 |
| 7,158,670 B1 * | 1/2007 | Fushiki et al. | 382/167 |
| 2002/0049950 A1 * | 4/2002 | Loaiza et al. | 714/763 |
| 2003/0093217 A1 * | 5/2003 | Petzold et al. | 701/201 |
| 2003/0140288 A1 * | 7/2003 | Loaiza et al. | 714/718 |
| 2004/0049598 A1 * | 3/2004 | Tucker et al. | 709/246 |
| 2004/0078491 A1 * | 4/2004 | Gormish et al. | 709/247 |
| 2004/0139480 A1 * | 7/2004 | Delpuch et al. | 725/135 |
| 2004/0146281 A1 * | 7/2004 | Yoon et al. | 386/95 |

(Continued)

OTHER PUBLICATIONS

"New change detection models for object-based encoding of patient minotoring video" Qiang Liu—2005 Citeseer (pp. 1-50).*

(Continued)

Primary Examiner—Jean B. Fleurantin
Assistant Examiner—Anh Ly
(74) Attorney, Agent, or Firm—Blakely, Sokoloff, Taylor & Zafman LLP

(57) ABSTRACT

The various methods and devices described herein relate to devices which, in at least certain embodiments, may include a method of decoding data or a data stream in a file, which may include checking for a first data portion of a plurality of data portions in the file, the first data portion having a first data value, reading in data from another data portion of the plurality of data portions, decoding or decompressing the data, performing a checksum operation on the decoded data if the first data portion having the first data value is not detected, and skipping a checksum operation on the decoded data if the first data portion having the first data value is detected. In the embodiment, a checksum operation on encoded data may also be skipped. In an embodiment, the first data value may include information or instructions about how a decoder may decode the data and may also include a tag or identifier.

19 Claims, 4 Drawing Sheets

U.S. PATENT DOCUMENTS

| | | | |
|---|---|---|---|
| 2004/0254957 A1* | 12/2004 | Hyotyniemi et al. | 707/104.1 |
| 2005/0212799 A1* | 9/2005 | Liao et al. | 345/420 |
| 2005/0271246 A1* | 12/2005 | Sharma et al. | 382/100 |
| 2006/0064716 A1* | 3/2006 | Sull et al. | 725/37 |
| 2006/0130120 A1* | 6/2006 | Brandyberry et al. | 725/136 |
| 2006/0155398 A1* | 7/2006 | Hoffberg et al. | 700/86 |
| 2006/0230070 A1* | 10/2006 | Colton et al. | 707/104.1 |
| 2007/0053423 A1* | 3/2007 | Uro | 375/240 |
| 2007/0053424 A1* | 3/2007 | Uro | 375/240 |
| 2007/0183740 A1* | 8/2007 | Ando et al. | 386/46 |
| 2007/0198515 A1* | 8/2007 | Ando et al. | 707/7 |
| 2007/0297771 A1* | 12/2007 | Yoon et al. | 386/124 |
| 2008/0141128 A1* | 6/2008 | Takahashi et al. | 715/700 |
| 2008/0317190 A1* | 12/2008 | Lapstun et al. | 375/376 |

OTHER PUBLICATIONS

"PNG Lossless Image Compression"—G. Roelofs—Lossless compression handbook, 2003—books.goole.com by Khalid Sayood (pp. 371-390).*

PCT International Search Report and Written Opinion for PCT International Appln No. PCT/US2007/026075, mailed on Jul. 30, 2008 (16 pages).

Boutell, Thomas "Portable Network Graphics (PNG) Specification V1.0" *Internet Citation, (Online)* Oct. 1, 1996, pp. 1-47, downloaded from http://www.w3.org/TR/REC-png-961001.

Chen G, et al. "Analyzing heap error behavior in embedded JVM environments" *Hardware/Software Codesign and System Synthesis, 2004. Codes + ISSS 2004 International Conference* in Stockholm, Sweden Sep. 8-10, 2004, pp. 230-235.

Kay, Jonathan et al. "Profiling and Reducing Processing Overheads in TCP/IP", *IEEE/ACM Transactions on Networking*, Dec. 1, 1996, vol. 4, No. 6, IEEE/ACM, New York, NY, US. pp. 817-828.

"CgBI PNG derivative and patent pending", Apr. 26, 2009, 13 pages, downloaded from the Internet at: http://www.nabble.com/CgBI-PNG-derivative-and-patent-pending-td23243753.html.

* cited by examiner

METHOD AND APPARATUS FOR SIMPLIFYING THE DECODING OF DATA

FIELD OF THE INVENTION

This invention relates to the decoding of data in a file, in particular, to methods and apparatuses for decoding data in an image file.

BACKGROUND OF THE INVENTION

Portable devices, such as personal digital assistants (PDAs) and cell phones, are becoming increasingly common. These portable devices have grown more complex over time, incorporating many features including, for example, MP3 player capabilities, web browsing capabilities, and the like. The storage capacity and performance of the hard drives of these portable devices, however, can be limited. As a result, certain tasks that are typically executed instantaneously on a desktop computer, such as displaying images for a graphical user interface, may take significantly longer on a portable device.

One image file format used to store and display such images includes the Portable Networks Graphics (PNG) format. Like the Graphics Interchange Format (GIF), the PNG format can be a good choice for text, logos, or graphics including sharp transitions or lines. Unlike GIF, however, the PNG format has the benefit of having an open, extensible file format. The PNG format also offers many useful features that may not be offered by older formats, such as for example, interlacing, full alpha-transparency and lossless compression.

The PNG format also offers several security checks during decoding or decompression. For example, the data in each PNG file is divided into sections or chunks and each chunk typically includes at least one redundancy check or checksum, allowing a decoder to detect corrupted data. Such checks are necessary, especially when a PNG file is downloaded from the Internet or an unknown source. If the file is coming from a source known to be secure, however, then such measures can sometimes unnecessarily delay the display of the image, especially on a portable device that has limited hard drive capability.

SUMMARY OF THE DESCRIPTION

The various methods and devices described herein relate to a method of decoding data or a data stream in a file, which, in at least certain embodiments, may include checking for a first data portion of a plurality of data portions in the file, the first data portion having a first data value, reading in data from another data portion of the plurality of data portions, decoding or decompressing the data, performing a checksum operation on the decoded data if the first data portion having the first data value is not detected, and skipping a checksum operation on the decoded data if the first data portion having the first data value is detected. In an embodiment, the first data value may include information or instructions about how a decoder may decode the data and may also include a tag or identifier.

In various embodiments, the file including the data may be any suitable image or non-image data file. According to an embodiment, the file may be an image data file such as a Portable Network Graphics (PNG) file. In at least certain embodiments, the first data portion may be a critical data chunk or critical chunk that may include information about properties of an image encoded by the file, while the second data portion may include an image data (IDAT) chunk that includes actual image data for the image encoded by the file. In various embodiments, the critical chunk may include instructions for decoding image data including a premultiplied alpha channel. Thus, in at least certain embodiments, the image data chunk may include data including a red, green and blue (RGB) color value premultiplied with a transparency value or alpha value. The image data chunk may also include data that does not include or is not preceded by a header. Thus, the critical chunk may include instructions for decoding data that does not include a header, allowing a decoder to skip one or more verification operations associated with decoding the image data, according to embodiments of the invention.

In at least certain embodiments, a file such as a PNG file that has been modified according to embodiments of the invention may be encoded and stored on a digital storage medium that may be capable of being read and displayed by a data processing system. Thus, in at least certain embodiments, a method includes encoding data into a first data section and a second data section included in a plurality of data sections in the file. In an embodiment, the first data section is encoded with a first data value of a first type or a second type. In one embodiment, the data value of the first type may include information to indicate that a data check such as a checksum may be performed on the data of the second data section, whereas the data value of the second type includes information that allows a data check on the data in the second data section to be skipped. Thus, in an embodiment, a data check or data check value may be encoded into the second data section if the first data section includes the first data value of the first type. Accordingly, in an embodiment, information may be encoded into the second data section to allow the data check to be skipped if the first data section includes a first data value of the second type.

Furthermore, in at least certain embodiments, a method may include encoding data into a first data section or critical data chunk that includes an indication to a decoder that a scan line of an image represented by the file has been filtered with a same filter as another scan line of the image represented by the file. In at least certain embodiments, a premultiplied alpha channel that includes an opaque image encoded by a four-channel RGBA image may also be encoded in a second data section or image data (IDAT) chunk.

Additional methods for simplifying the decoding of data are also described. Various devices which perform one or more of the foregoing methods and machine readable media which, when executed by a processing system, cause the processing system to perform these methods, are also described. For example, in an embodiment, the method above may be performed by an embedded device that may read and display an image as part of a user interface.

BRIEF DESCRIPTION OF THE DRAWINGS

The invention is described by way of example with reference to the accompanying drawings, wherein.

DETAILED DESCRIPTION

Figure 1A:
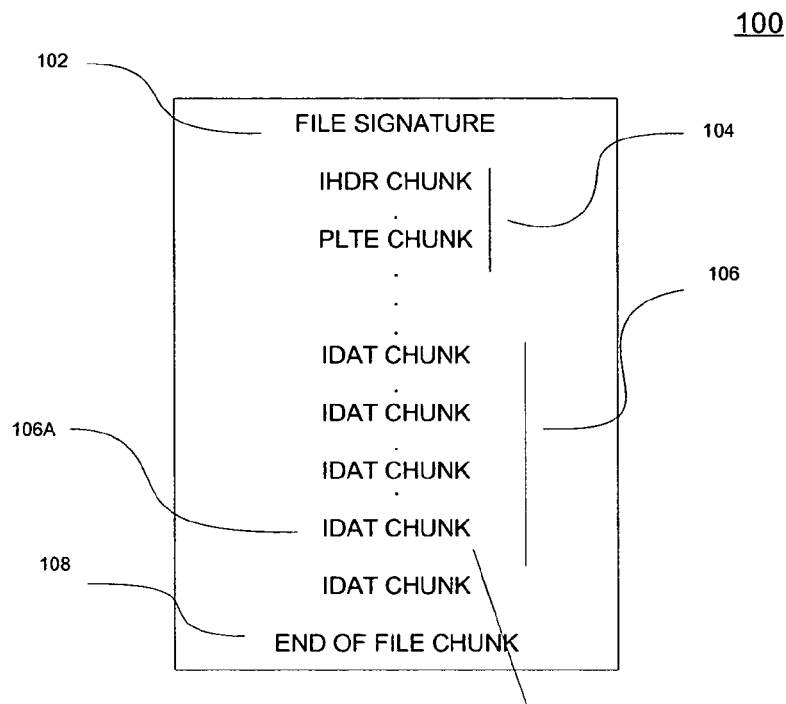
FIG. 1A illustrates an example structure of a prior art data file.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the invention may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Various operations will be described as multiple discrete operations. In turn, in a manner that is most helpful in understanding the present invention, however, the order of description should not be construed as to imply that these operations are necessarily order dependent. In particular, these operations need not be performed in the order of presentation.

Furthermore, reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1A illustrates an example structure of a simplified prior art PNG image data file or file 100. Note that the official PNG file format is described in the PNG Specification, W3C Recommendation, v.2, 14 Oct. 2003, and the International Standard ISO/IEC 15948:2003. In FIG. 1A, file 100 may begin with an 8-byte file signature 102 that identifies file 100 as a PNG image data file to be decoded. Note that a PNG file is typically encoded or compressed by a method referred to as deflation and is typically decoded or decompressed by a method referred to as inflation.

Following file signature 102, a data or byte sequence in file 100 is typically divided into data sections or "chunks." Each chunk may typically have a length of 4 bytes and have an encoded identifier or 4-letter name that indicates the type of information or data (such as actual image data or other data related to the decoding of the image data) that a chunk is to convey to a decoder. In FIG. 1A, a plurality of critical chunks 104 comes after file signature 102 and may include data that is necessary for a decoder to inflate or decode the actual image data. Examples of critical chunks 104 may include an IHDR or PLTE chunk. An IHDR chunk may include properties related to the encoded image such as the width and height of the image, bit depth or whether the image can display alpha-channel transparency. As another example, a PLTE chunk may provide a palette table for the colors in a palette-based image. Although only two critical chunks 104 are shown in FIG. 1A, there may typically be 5-10 or more critical chunks 104 in a file 100.

Figure 1B:
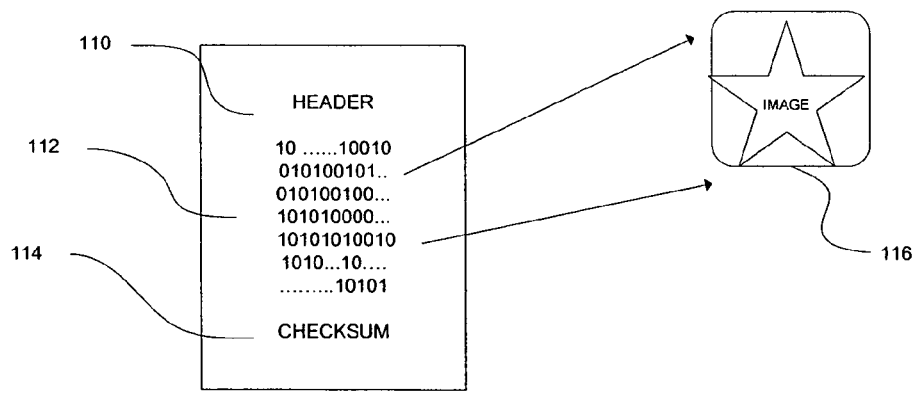
FIG. 1B illustrates an example structure of an image data chunk included in the prior art data file of FIG. 1A.

Next, the actual image data is divided among a plurality of IDAT chunks 106. Note that in order to protect against corrupted data in file 100, each critical chunk 104 and each IDAT chunk 106 in file 100 typically includes at least one checksum. As an example, a checksum may be computed by a decoder as the data is decoded and then compared to a value stored in the file during encoding. If the values do not match, data corruption is indicated. To further illustrate, FIG. 1B shows the components or structure of one of a plurality of IDAT chunks 106A of FIG. 1A. IDAT chunk 106A may be composed of a header 110, image data 112 and a checksum 114. Image data 112 may include the actual image data for image 116. Header 110 comes before image data 112 and provides information about image data 112, such as for example, how compressed image data 112 is and other specifics a decoder may need to decode image data 112. Next, in IDAT chunk 106A, is checksum 114. One or more checksums such as checksum 114 may be performed on compressed data in IDAT chunk 106 as well as on decompressed or decoded data from IDAT chunk 106. Returning to FIG. 1A, end of file chunk 108 comes after the plurality of IDAT chunks 106 and indicates to a decoder that there are no more chunks in file 100 to be decoded.

Thus, note that in the PNG file format as described above and in the PNG specification, various verification operations are included to verify the integrity of the data that is to be decoded. Such operations include multiple data checks or checksums as described in relation to FIG. 1A. Note that such checksums may be important when a PNG image is downloaded from the Internet or other source that may not be secure. In many cases, however, such operations are not needed and only serve to slow down the display of the image. For example, when an image is being downloaded from a hard drive of a same device on which the image is to be displayed, the checksums may be unnecessary because the data is known to be secure. Accordingly, embodiments of the invention modify the PNG specification or PNG file format to simplify the decoding of data. In one embodiment, such a simplification may include adding a new critical chunk to indicate to a decoder that a checksum is to be skipped. Accordingly, in the embodiment, an IDAT chunk may be encoded without a checksum operation. Various other examples of modifications to the PNG file format that may simplify the decoding of data are also described below.

Figure 2A:
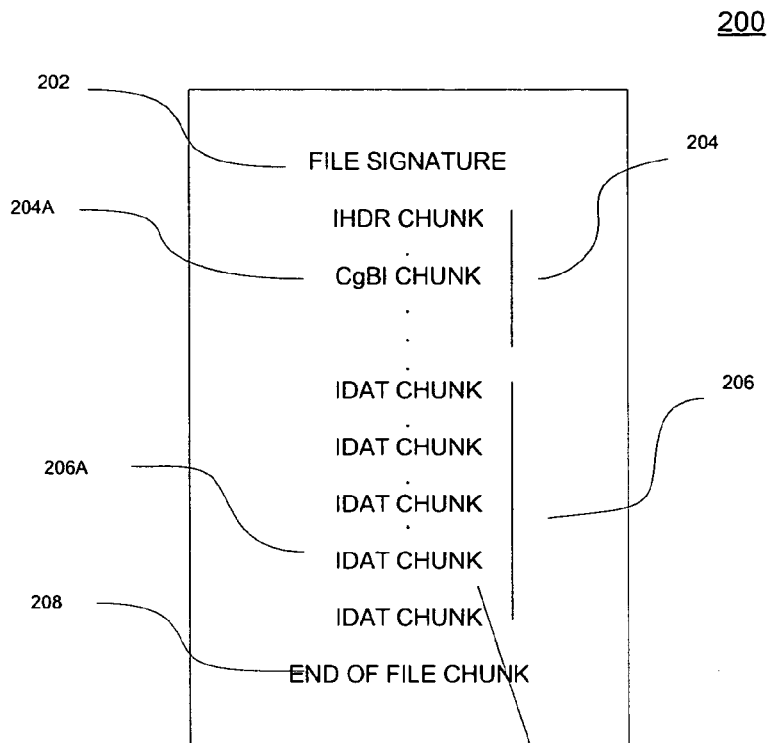
FIG. 2A illustrates an example structure of a data file in accordance with an embodiment of the present invention.

Referring now to FIG. 2A, which shows a file 200 in accordance with an embodiment of the invention. In the embodiment, file 200 may include a file signature 202, a plurality of critical chunks 204, a plurality of IDAT chunks 206 and an end of file chunk 208. In the embodiment, one of plurality of critical chunks 204 includes a critical chunk 204A that may include instructions to omit or skip one or more checksums or cyclic redundancy checks (CRCs) in one or more of the plurality of IDAT chunks 206 or critical chunks 204. In the example shown, an identifier of critical chunk 204A is CgBI, but could be any suitable identifier, name or tag that identifies its purpose to a decoder. Note that checksums may be skipped or omitted without compromising security because file 200 may be received from a known source, such as for example, the hard drive of a device that is to display an image encoded in file 200. In one embodiment, file 200 may have been stored in a hard drive of an embedded system of a portable device at production time.

Figure 2B:
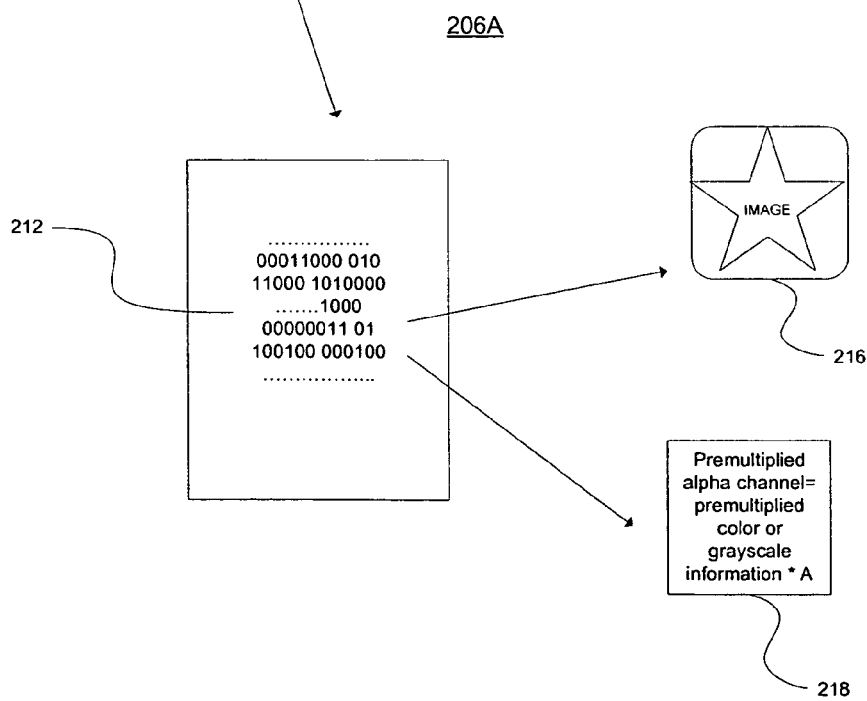
FIG. 2B illustrates an example structure of an image data chunk in accordance an embodiment of the present invention.

In at least some embodiments, the purpose of critical chunk 204A may be to simplify a decoding of data in file 200 by omitting one or more checksums or another operation related to verifying the integrity of file 200. For example, critical chunk 204A may also, in an embodiment, include instructions for decoding data that does not include a header in the one or more of a plurality of IDAT chunks 206. To illustrate, FIG. 2B shows one of a plurality of IDAT chunks 206A of FIG. 1A, that may be included in file 200 according to embodiments of the invention. According to the embodiment, IDAT chunk 206A includes unencapsulated image data 212 that represents image 216 or a portion of image 216. Unencapsulated image data 212, in an embodiment, may include data that is not preceded by a header, such as header 110 of previous FIG. 1B, and/or data without one or more checksums, such as checksum 114 of FIG. 1B. Thus, in one embodiment, instructions included in critical chunk 204A allow a decoder to decode data without a header and to skip the performance of one or more verification operations associated with decoding image data. Such operations may include various checks, such as including, but not limited to, verifying that the data is an expected compression or deflation type, such as specified in the header. Furthermore, in at least some embodiments, critical chunk 204A may also inform a decoder that the decoded data from one or more of plurality of IDAT chunks 206 will have a little-endian format.

In one embodiment, image data 212 may include a pre-multiplied alpha channel 218 to simplify the decoding of the data in IDAT chunk 206A. To illustrate, note that in an RGBA image or true color image with variable transparency, a color of a pixel may be represented by a red, green and blue or RGB value, multiplied by an alpha value between 0 and 1, representing a desired degree of transparency (or, more accurately, opacity). Thus, for example, non-premultiplied RGBA values corresponding to a white pixel with a desired 50% degree of opacity may have stored values of (1.0, 1.0, 1.0, 0.5), whereas pre-multiplied RGBA values, for the same pixel may have stored values of approximately (0.5, 0.5, 0.5, 0.5). Note that presently, the PNG format does not allow encoded data to include a premultiplied alpha channel. According to embodiments of the invention, however, premultiplying an RGB value with an alpha value may simplify the decoding of data in file 200 because computations involving the alpha value have already been completed and may not have to be performed for each pixel during decoding.

In at least certain embodiments, critical chunk 204A may include instructions to indicate to a decoder that a four-channel RGBA image is fully opaque. Note that typically, when a PNG image is opaque it may be encoded with a 3-channel RGB format. However, in an embodiment of the invention, the opaque image may be encoded with a 4-channel RGBA format. Thus, in an embodiment, an alpha component or value may be disregarded or ignored. In certain embodiments, encoding an opaque image using a 4-channel RBGA format may be advantageous because an 4-channel RGBA images may be more efficient to manipulate than 3-channel RGB images.

Furthermore, in at least certain embodiments, critical chunk 204A may specify an arbitrary pixel ordering. Note that the PNG file format typically requires that image components for a pixel to be ordered R-G-B-A, an order that may not be supported by all hardware. Thus, in an embodiment, the image components may have an order different from R-G-B-A. For example, the pixel ordering of the image components may be B-G-R-A or other suitable order to allow a decoder to efficiently decode the data.

In an embodiment, critical chunk 204A may also indicate to a decoder that substantially each row of pixels or scan line of an image uses a same or similar filter. Note that during encoding of a PNG file, there may be a number of filters applied to each scan line of an image to achieve improved compression. Some filters may be more complex than others, thus requiring extra work to be performed by a decoder while decoding the image. In an embodiment, information may be added to the file format to let the decoder know that each scan line of the image was filtered with a same filter type or a same filter method. Thus, in the embodiment, when the decoder encounters this hint or indication, the decoder may check for a single filter type or filter method and avoid performing extra work required by complex filtering methods.

It should be noted that the number and type of chunks shown in file 200 have been simplified for clarity but in various embodiments, file 200 may include additional elements such as additional chunks (critical or non-critical chunks, otherwise known as ancillary chunks) with varying chunk identifiers or names. In other embodiments, file 200 may not be divided into chunks but may be stored in other formats consistent with other image or non-image data formats.

Figure 3:
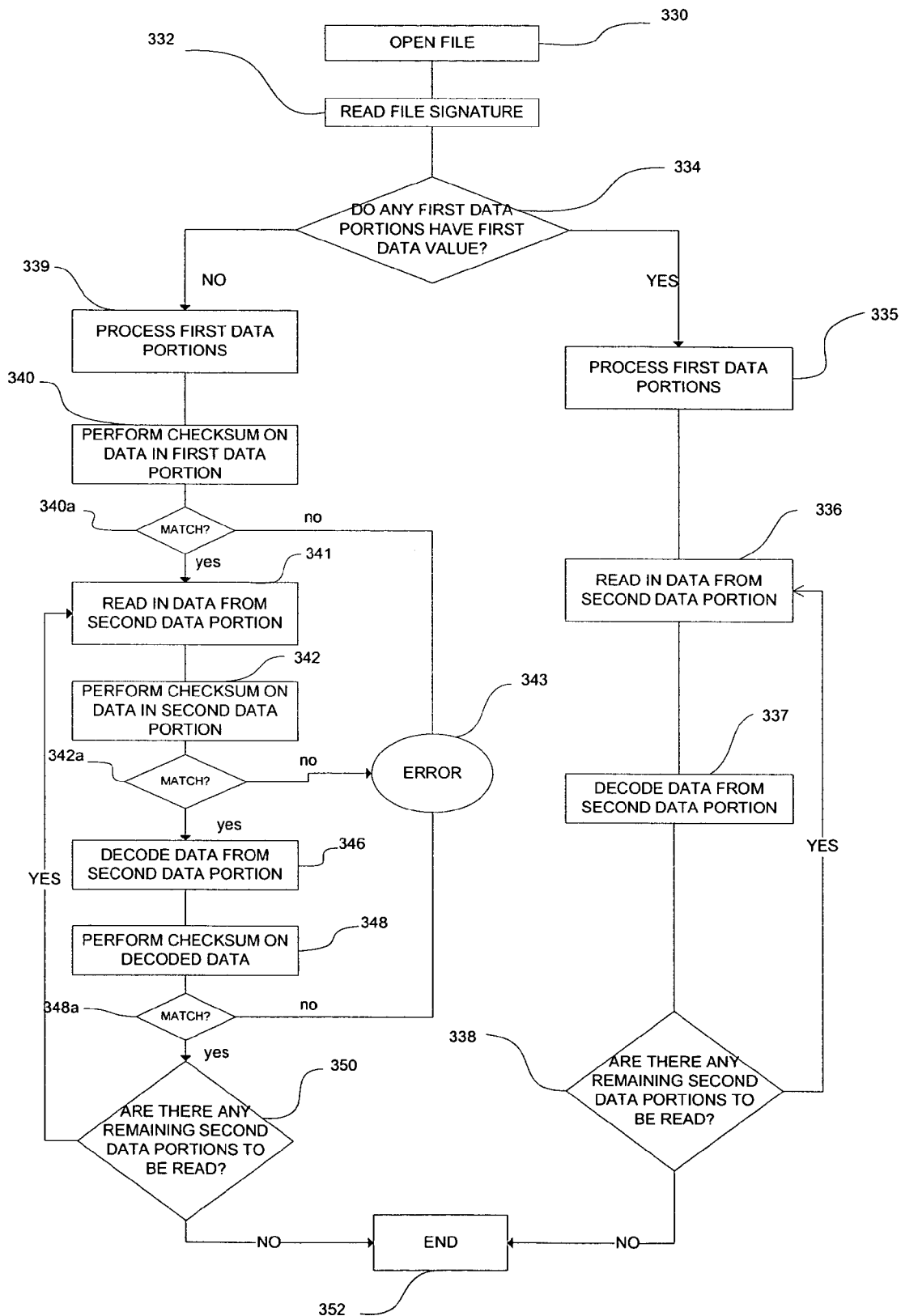
FIG. 3 is a flow diagram of a process related to a decoding of the data file of FIG. 2A in accordance with embodiments of the present invention.

FIG. 3 is a flow diagram 300 illustrating a method for simplifying a decoding of data in a data file, in accordance with embodiments of the invention. In the example shown, an image file such as, for example, file 200 of FIG. 2A may be opened at a block 330. At a block 332, an 8-byte file signature may be read to give a decoder information about the format of the file. In the embodiment, at a decision block 334, the method includes checking for a first data portion or section having a first data value. In the example, the first data portion may include a critical chunk 204A, while a first data value may include information or instructions as to how the decoding of the data is to be simplified. In the embodiment, simplifying the decoding of the data may include skipping one or more checksums. For example, this may include skipping a checksum on the decoded data, encoded data or both The first data value may also include a particular identifier, name, or tag, such as the name of critical chunk 204A, CgBI of FIG. 2A, that indicates that the critical chunk 204A contains such information.

Thus, if a critical chunk such as critical chunk 204A with a first data value is encountered at decision block 334, the process flows down the right branch of flow diagram 300 to a block 335. In the embodiment, at block 335, first data portions or critical chunks 204 may be processed by the decoder. In one embodiment, a critical chunk such as 204A may include a function call to a decompression library that does not include a checksum. In the embodiment, a checksum or data check is not performed and the process can continue on to a next block 336, where the decoder can begin to read actual image data from a second data portion such as one of a plurality of IDAT chunks 206. The data is then decoded at a next block 337. In an embodiment, critical chunk 204A may have indicated to the decoder that substantially each scan line uses a same or similar filter. In at least certain embodiments decoding data may include skipping a multiplication of an alpha value with an RGB or grayscale value because an alpha value has already been premultiplied with the RGB or grayscale value.

In an embodiment, decoding the data may include inflating deflated data. Additionally, in one embodiment, the actual image data to be decoded may include unencapsulated data such as image data 212 of FIG. 2A. In the embodiment, decoding unencapsulated data may simplify the decoding process because the decoder may skip one or more various verification operations related to information in the header. Finally, once substantially all of the data in the IDAT chunk is decoded, the process moves on to a next block 338 so that a decoder can check for any additional IDAT chunks. If there are remaining IDAT chunks to be decoded, the process returns to block 336 to read in data from the next IDAT chunk. The process repeats itself through blocks 336-338, until all of the IDAT chunks in the file have been read and decoded. In the embodiment, the process of decoding data in the image file can then end at block 352.

In the alternative, returning to decision block 334, if the decoder encounters a critical chunk that does not include a first data value such as an identifier or instructions for simplifying the decoding of data, the method branches to a block 339 where data in one or more first data portions or critical chunks is processed. In the embodiment, a critical chunk may include a data value such as a function call to a decompression library. In the embodiment, the function call includes a checksum. A checksum is then performed on the data read from the one or more critical chunks in a next block 340. If the checksum value computed does not match a stored value at a decision block 340a, for any of the critical chunks, an error message is generated at 343. If the checksum value does match the stored value for each critical chunk, the process can continue to a block 341 where, actual image data from a second data portion or IDAT chunk is read.

In the example, a second checksum may be computed or performed at a next block 342. Again, if the checksum value computed does not match a stored value at a decision block 342a, an error message is generated at block 343. According to the embodiment, if the checksum does match the stored value, the data is indicated as correct and the decoder may then begin decoding data in the IDAT chunk at a block 346. Decoding data at block 346 may include decoding data in the IDAT chunk that includes a header and a checksum. Thus, at a next block 348, a third checksum is performed, this time on the decoded data to verify that the decoded data or output pixels are correct. Again, if a computed checksum does not match a stored value at 348a, the process ends in an error at block 343. If the computed checksum does match, the process continues on to a next decision block 350.

At decision block 350, in the embodiment, once all of the image data from the second data portion has been decoded, a decoder may check to see at if any second data portions or IDAT chunks remain to be decoded. If so, the process returns to a block 341 so that the decoder can read in data from a next IDAT chunk. The process repeats itself through blocks 341-350, until all of the IDAT chunks in the file have been decoded. When there are no remaining IDAT chunks to be decoded, the decoding of the file may end at block 352.

Thus, in an embodiment, a PNG data file format has been modified to include a critical data chunk that may convey information to a decoder about skipping a verification operation during a decoding of data in the IDAT chunk. Thus, in at least certain embodiments, a new critical chunk, such as for example, CgBI, has been added to a PNG file format to include information about skipping a computation of a checksum. Furthermore, in at least certain embodiments, the information about skipping the verification operation may include information about skipping the reading of a header in an IDAT chunk. Thus, a PNG file format has, in an embodiment, been modified such that an IDAT chunk may include image data stored without a header and without a data check value appended to the data. In various embodiments, the data check value omitted may include a cyclic redundancy check (CRC) or checksum value.

Various other modifications to the PNG format that allow a decoder to more quickly decode data have also been described. In an embodiment, information to indicate that each filter line of the PNG image has been filtered using a same filter may be encoded into the PNG file. In another example, a premultipled alpha channel may be encoded into the image data and an opaque image may be encoded with a 4-channel RGBA image.

In at least certain embodiments, the PNG file may be encoded and stored on a digital storage medium that may be capable of being read and displayed by a data processing system such as, for example, a handheld portable device or mobile cellular telephone. Thus, in at least certain embodiments, a method includes encoding data into a critical chunk of a PNG file, the critical chunk including a first data value of a first type or a second type. In one embodiment, the data value of the first type may include encoded information that indicates to a decoder that a verification operation such as a computation of a checksum may be performed. Accordingly, in the embodiment, a data check value such as a checksum value may be appended or included in an IDAT chunk. Thus, in an embodiment, the PNG file may store an image that may be decoded with a checksum because security may be a concern.

In the embodiment, however, when security may not be a concern, data may be encoded into a critical chunk to include a data value of a second type. In an embodiment, the data value of the second type may include information that allows a decoder to skip the data check on image data from the IDAT chunk. Thus in the embodiment, an identifier or other information may be encoded in the critical data chunk to indicate that a computation of a checksum may not be performed. Furthermore, in at least certain embodiments, a method may include encoding data into the critical data chunk that includes an indication to a decoder that a scan line of an image represented by the file has been filtered with a same filter as another scan line of the image represented by the file. In at least certain embodiments, a premultiplied alpha channel that includes an opaque image encoded by a four-channel RGBA image may also be encoded in an IDAT chunk.

Figure 4:
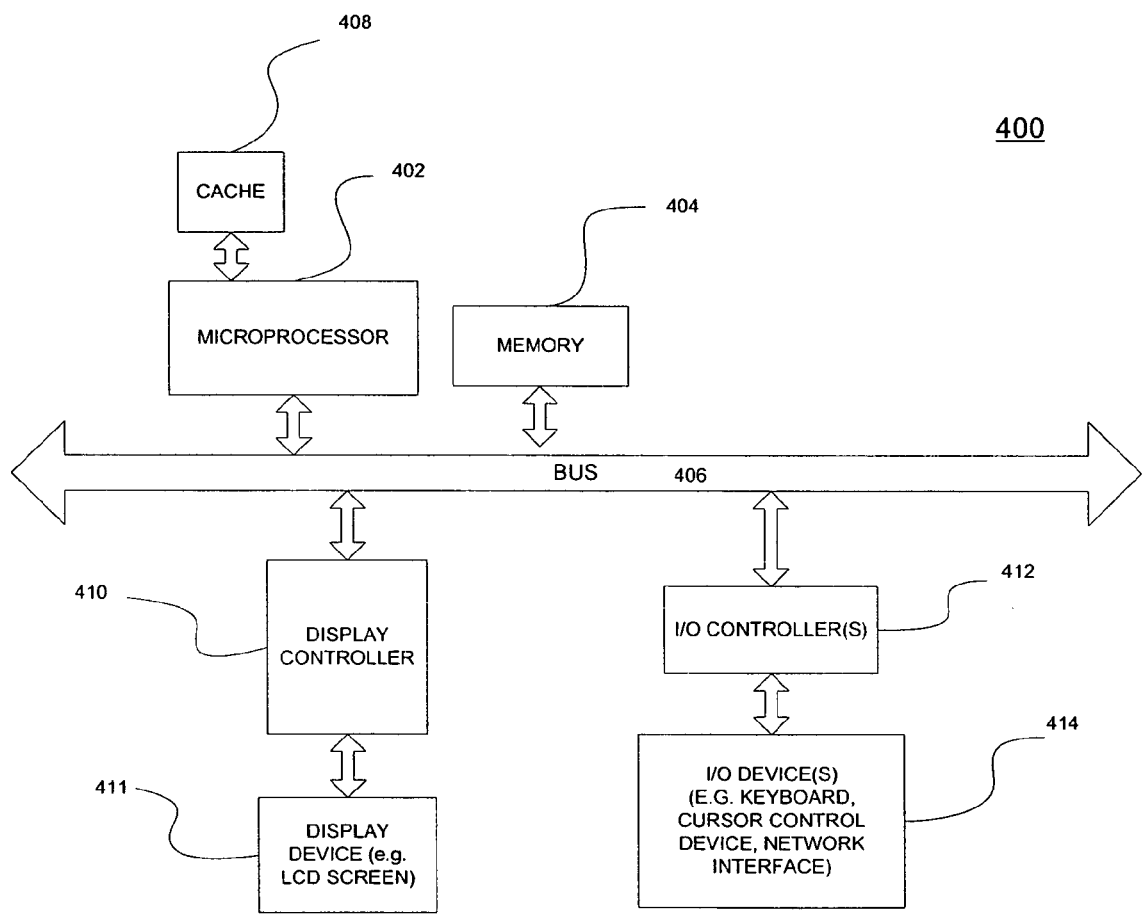
FIG. 4 is a block diagram illustrating various components of an example device, with which embodiments of the present invention can be practiced

FIG. 4 shows an example of a device 400 according to an embodiment of the invention that may perform the method of FIG. 3. This device may include a processor, such as microprocessor 402, and a memory 404, which are coupled to each other through a bus 406. In the embodiment, device 400 may include an embedded device including a processor that processes data having little-endian format. The device 400 may optionally include a cache 408 which is coupled to the microprocessor 402. This device may also optionally include a display controller 410 and display device 411 which is coupled to the other components through the bus 406. One or more input/output controllers 412 are also coupled to the bus 406 to provide an interface for input/output devices 414. The bus 406 may include one or more buses connected to each other through various bridges, controllers, and/or adapters as is well known in the art. The input/output devices 414 may include a keypad or keyboard or a cursor control device such as a touch input panel. Furthermore, the input/output devices 414 may include a network interface which is either for a wired network or a wireless network (e.g. an RF transceiver).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of converting data in a file using an apparatus having a processor and a memory, the method comprising:
    checking for a first data portion of a plurality of data portions in the file, the first data portion being a critical data chunk in a Portable Network Graphics (PNG) file and having a first data value;
    reading in data from a second data portion of the plurality of data portions;
    decoding the data in the second data portion of the plurality of data portions;
    wherein decoding the data in the second data portion comprises decoding data for an opaque image encoded with a four-channel blue, green, red and alpha format;
    skipping a multiplication of a color value with a transparency value if the first data portion having the first data value is detected;
    performing a checksum operation using the processor on the decoded data from the second data portion if the first data portion having the first data value is not detected; and
    skipping the checksum operation on the decoded data from the second data portion if the first data portion having a first data value is detected.

2. The method of claim 1 wherein reading in data from a second data portion comprises reading in compressed data from an image data chunk.

3. The method of claim 1 wherein skipping the multiplication of the color value with the transparency value comprises skipping a multiplication of a red, green and blue (RGB) value with an alpha value.

4. The method of claim 1 wherein checking for the first data portion having the first data value comprises checking for the first data portion having an identifier that identities the first data portion as a critical chunk that instructs a decoder to inflate data without a header.

5. A machine-readable storage medium storing executable program instructions which when executed cause the machine to perform a method comprising:
    checking for a first data portion of a plurality of data portions in the file, the first data portion being a critical data chunk in a Portable Network Graphics (PNG) file and having a first data value;
    reading in data from a second data portion of the plurality of data portions:
    decoding the data in the second data portion of the plurality of data portions;
    wherein decoding the data in the second data portion comprises decoding data for an opaque image encoded with a four-channel blue, green, red and alpha format;
    skipping a multiplication of a color value with a transparency value if the first data portion having the first data value is detected;
    performing a checksum operation on the decoded data from the second data portion if the first data portion having the first data value is not detected; and
    skipping the checksum operation on the decoded data from the second data portion if the first data portion having the first data value is detected.

6. The machine-readable medium of claim 5 wherein checking for the first data portion comprises checking for a critical data chunk in an image file.

7. The machine-readable medium of claim 5 wherein the method further comprises skipping a checksum operation on data that is not decoded if the first data portion having the first data value is detected.

8. The machine-readable medium claim 5 wherein reading in data from a second data portion comprises reading in deflated data from an image data chunk.

9. The machine-readable medium of claim 5 wherein performing the method further comprises skipping a multiplication of a color value with a transparency value if the first data portion having the first data value is detected.

10. The machine-readable medium of claim 9 wherein the second data portion comprises a premultiplied blue, green and red (BGR) value with an alpha value.

11. The machine-readable medium of claim 5 wherein decoding the data in the second data portion comprises inflating data with little-endian format.

12. An apparatus having a processor and a memory, comprising:
    means for checking, including the processor, for a first data portion of a plurality of data portions in the file, the first data portion being a critical data chunk in a Portable Network Graphics (PNG) file And having a first data value;
    means for reading in data from a second data portion of the plurality of data portions;
    means for decoding the data in the second data portion of the plurality of data portions;

wherein decoding the data in the second data portion comprises decoding data for an opaque image encoded with a four-channel blue, green, red and alpha format;

means for skipping a multiplication of a color value with a transparency value if the first data portion having the first data value is detected;

means for performing a checksum operation using the processor on the decoded data from the second data portion if the first data portion having the first data value is not detected; and means for skipping the checksum operation on the decoded data from the second data portion if the first data portion having a first data value is detected.

13. An apparatus, comprising:

a processor; and a memory coupled to said processor, said memory having stored thereon instructions which, when executed by a decoder cause the decoder to perform a method, the method comprising:

checking for a first data portion of a plurality of data portions in a file, the first data portion being a critical data chunk in a Portable Network Graphics (PNG) file and having a first data value;

reading in data from a second data portion of the plurality of data portions:

decoding the data in the second data portion of the plurality of data portions;

wherein decoding the data in the second data portion comprises decoding data for an opaque image encoded with a four-channel blue, green, red and alpha format;

skipping multiplication of a color value with a transparency value if the first data portion having the first data value is detected;

performing a checksum operation on the data from the second data portion if the first data portion having the first data value is not detected; and skipping the checksum operation on the data from the second data portion if the first data portion having a first data value is detected.

14. The apparatus of claim 13 wherein checking for the first data portion comprises checking for a critical data chunk in an image file.

15. The apparatus of claim 14 wherein the memory further comprises instructions for decoding data including an arbitrary ordering of components for a pixel.

16. The apparatus of claim 13 wherein reading in data from a second data portion comprises reading in image data from a portable networks graphics (PNG) file.

17. The apparatus at claim 13 wherein the memory further comprises instructions to decode data for an opaque image encoded with a 4-channel blue, green, red and alpha (BGRA) format.

18. The apparatus of claim 13 wherein checking for a first data portion having a first data value comprises checking for a data portion that indicates to a decoder that each scan line of an image was filtered with a same filter type.

19. The apparatus of claim 13 wherein checking for a first data portion having a first data value comprises checking for a first data portion that indicates to a decoder that each scan line of an image was filtered with a same filter method.

* * * * *

UNITED STATES PATENT AND TRADEMARK OFFICE
CERTIFICATE OF CORRECTION

| | | |
|---|---|---|
| PATENT NO. | : 7,716,166 B2 | Page 1 of 1 |
| APPLICATION NO. | : 11/650712 | |
| DATED | : May 11, 2010 | |
| INVENTOR(S) | : Eric J. Albert et al. | |

It is certified that error appears in the above-identified patent and that said Letters Patent is hereby corrected as shown below:

On the face page, in field (56), under "Other Publications", in column 2, line 2, delete "minotoring" and insert -- monitoring --, therefor.

In column 3, line 3, after "practiced" insert -- . --.

In column 8, line 49, delete "premultipled" and insert -- premultiplied --, therefor.

In column 10, line 10, in Claim 4, delete "identities" and insert -- identifies --, therefor.

In column 10, line 21, in Claim 5, delete "portions:" and insert -- portions; --, therefor.

In column 10, line 44, in Claim 8, after "medium" insert -- of --.

In column 10, line 62, in Claim 12, delete "And" and insert -- and --, therefor.

In column 11, line 26, in Claim 13, delete "portions:" and insert -- portions; --, therefor.

In column 12, line 1, in Claim 13, after "skipping" insert -- a --.

In column 12, line 19, in Claim 17, delete "at" and insert -- of --, therefor.

Signed and Sealed this
Eighth Day of November, 2011

David J. Kappos
*Director of the United States Patent and Trademark Office*